US007383066B2

(12) United States Patent
Park

(10) Patent No.: US 7,383,066 B2
(45) Date of Patent: Jun. 3, 2008

(54) SIDE BUTTON SWITCH IN MOBILE COMMUNICATION TERMINAL AND VIBRATION-PREVENTING DEVICE THEREOF

(75) Inventor: Min-Ho Park, Seoul (KR)

(73) Assignee: LG Electronics Inc., Seoul (KR)

(*) Notice: Subject to any disclaimer, the term of this patent is extended or adjusted under 35 U.S.C. 154(b) by 421 days.

(21) Appl. No.: 10/341,356

(22) Filed: Jan. 14, 2003

(65) Prior Publication Data

US 2004/0204200 A1 Oct. 14, 2004

(30) Foreign Application Priority Data

Aug. 14, 2002 (KR) ...................... 10-2002-0048071

(51) Int. Cl.
*H04M 1/00* (2006.01)
*H04B 1/38* (2006.01)
*H04B 1/08* (2006.01)
*H04K 11/02* (2006.01)

(52) U.S. Cl. .................... 455/575.1; 455/90.3; 455/347

(58) Field of Classification Search ............. 455/569.1, 455/550.1, 575.1, 90.3, 564, 347; 379/330
See application file for complete search history.

(56) References Cited

U.S. PATENT DOCUMENTS 5,265,274 A * 11/1993 Knutson et al. ............ 455/347
6,266,542 B1 * 7/2001 Stern et al. .............. 455/569.1
6,640,114 B2 * 10/2003 Bae ............................ 455/566
6,876,837 B2 * 4/2005 Kuroshima et al. ........ 455/90.3
7,027,036 B2 * 4/2006 Yang .......................... 345/170
2002/0032011 A1 * 3/2002 Park ............................ 455/90

FOREIGN PATENT DOCUMENTS

JP 62-34728 2/1987
JP 5-234463 9/1993
JP 8-273477 10/1996
JP 11-283461 10/1999
JP 2002-15639 1/2002

OTHER PUBLICATIONS

Japanese Search Report dated Dec. 17, 2007.

* cited by examiner

*Primary Examiner*—Tilahun B Gesessse
(74) *Attorney, Agent, or Firm*—Ked & Associates, LLP

(57) ABSTRACT

A mobile communication terminal includes at least one function key which demonstrates improved resistance to vibration. This is achieved by positioning a spacer between the function key and an associated switch, which in the case of a mobile terminal may be a tact switch. The spacer may be made from an elastic material which compresses when inserted between the switch and function key. Alternatively, the spacer may be made from a rigid material. Also, the spacer may extend from one or more layers of a keypad and may be made to bend into proper orientation adjacent a side button on the terminal. By eliminating the clearance gap between the function key and switch, undesirable noise is prevented and improved stability to vibration is demonstrated. Also, a better feel to as user is achieved as a result of the reduction or elimination of this clearance gap.

34 Claims, 8 Drawing Sheets

SIDE BUTTON SWITCH IN MOBILE COMMUNICATION TERMINAL AND VIBRATION-PREVENTING DEVICE THEREOF

BACKGROUND OF THE INVENTION

1. Field of the Invention

The present invention relates to keypads, and more particularly to a keypad structure for inputting signals into electronic devices including but not limited to those having vibration motors.

2. Background of the Related Art

FIG. 1 shows a folding-type mobile communication terminal of the related art. This terminal includes an upper part 1 and a lower part 2. A lower end of the upper part is hinge-coupled with an upper end of the lower part so as to turn within a predetermined range of angles. The terminal also includes a speakerphone 4 and a liquid crystal display screen 5 which displays characters and numbers. These elements are installed on a front part of a case of the upper part. Also included is a keypad 7 and side buttons 8. The keypad has a plurality of key buttons 10 formed thereon and is installed on a front part of a case 6 of the lower folding portion. The side buttons control the volume of the speakerphone and are installed at one lateral side of the case.

As shown in the enlarged view of FIG. 2, the keypad is mounted inside the case so that tops of key buttons 10 protrude out of the case through corresponding key button holes 9 formed on the front part of the case. Also, the side buttons are inserted through corresponding side button holes 11, so that top and bottom portions of the corresponding side buttons protrude from the side of the case.

The side buttons operate by activating a tact switch 12. As shown, a nose 13 of the tact switch contacts the bottom portion of the side button protruding inward into the case so as to support the side button 8. At another end, the tact switch is attached to a printed-circuit board 14 installed inside the case, so as to adhere closely to a rear face of the keypad. In operation, pressure is applied to nose 13 of the tact switch when a user presses a side button. A tact switch signal is then transferred to the printed-circuit board 14 in order to adjust the volume of the speaker phone.

This related-art terminal has a number of drawbacks. For example, a stroke of the nose of the tact switch is usually only 0.2 mm. If an assembly tolerance is +0.2 mm at a place where the side button is coupled with the case, then when the terminal is assembled the side button may push against a predetermined portion of the tact switch. As a result, the on/off operation of the tact switch 12 may be lost or at least adversely affected.

In order to overcome such a disadvantage, it has been proposed to couple the assembly of the side button with the case in such a maimer that one face of the keypad is just in contact with the nose of the tact switch. While this approach may have some limited success, it is complicated to perform and thus significantly increases the assembly time of the terminal.

FIG. 3 shows an enlarged cross-sectional view of the mobile terminal of FIG. 2. In this view, side button 8 and tact switch 12 are coupled with case 6 and printed-circuit board 14 (not shown in this figure) so as to maintain an interval of 0.1 mm between the nose of the tact switch and the adjacent bottom of the side button.

This modification of the related art also has drawbacks. In this arrangement, the side button is not fixed to the side button hole 11, but rather is merely inserted into the side button hole for assembly. As a result, the side button may float and thus may be affected by a vibration motor which is activated in the terminal when a call is received. More specifically, the side button may collide with the nose of the tact switch when the variation motor is activated, thereby producing an undesirable noise. Moreover, if the interval between the bottom 15 of the side button and the nose 13 of the tact switch becomes greater than −0.2 mm by the assembly tolerance, the tact switch may fail to smoothly operate when the side button is pushed.

A need therefore exists for a terminal which demonstrates improved resistance to vibration compared with related-art terminals, while at the same time prevents malfunctions from occurring as a result of inaccurate assembly tolerances relating to one or more function keys on the terminal.

SUMMARY OF THE INVENTION

An object of the present invention is to provide an input device having at least one function key which overcomes one or more of the drawbacks of related art input devices.

Another object of the present invention is to provide an input device which demonstrates improved resistance to vibration.

Another object of the present invention is to provide an input device having at least one function key which prevents malfunctions from occurring as a result of inaccurate assembly tolerances.

Another object of the present invention is to provide an input device which simultaneously achieves both of the aforementioned objects.

Another object of the present invention is to provide a keypad which achieves any one or more of the aforementioned objects.

Another object of the present invention is to provide an electronic device which includes an input device which achieves any one or more of the aforementioned objects.

Another object of the present invention is to provide a mobile communications terminal having an input device which achieves any one or more of the aforementioned objects.

Another object of the present invention is to provide a mobile communications terminal which demonstrates improved resistance to vibration by eliminating clearance gaps between one or more function keys of the terminal and their corresponding switches. By achieving this object, the further object of reducing an undesirable noise is achieve as a result of the key rattling against either the terminal housing or switch when vibration is applied.

Another object of the present invention is to provide a mobile communications terminal wherein a tact switch for a function key smoothly operates according to push operation of the side button when a clearance gap between a nose of the tact switch and a bottom of the side button becomes wide open by an assembly tolerance.

To achieve these and other objects and advantages, the present invention provides a mobile communication terminal which includes a keypad installed in a case so that tops of key buttons formed on a front face protrude through key button holes formed in a front part of the case, at least one side button having a top protruding outside onside of the case and a bottom protruding inside the case so as to be inserted in a side button hole, a printed-circuit board having one end of a tact switch attached thereto so that the bottom of the side button confronts a nose of the tact switch with a predetermined interval, the printed-circuit board adhering closely to a rear side of the keypad so as to be installed inside the case, a side button vibration-preventing device in the mobile communication terminal according to the present invention is characterized in that the an elastic member is inserted between the bottom of the side button and the nose of the tact switch.

In another aspect of the present invention, a side button switch in a mobile communication terminal includes a switch button having a top penetrating a key button hole formed in a case of the mobile communication terminal and a bottom failing to penetrate the key button hole, an elastic member adhering closely to the bottom of the switch button, and a tact switch carrying out a switch operation by a force generated from the elastic member interoperating with the switch button pushed inside the case wherein the side button is a switch connected to an electronic circuit inside the mobile communication terminal.

DETAILED DESCRIPTION OF THE PREFERRED EMBODIMENTS

The present invention is a function key switch which includes a button (or functions key) having a top which may protrude through a key hole formed in a case of an electronic device. In order to reduce or eliminate a clearance gap between the button and a corresponding switch, a spacer is positioned between the button and switch. If desired, the spacer may be adhered to either a bottom of the button or an end of the switch. The spacer may be made from an elastic or rigid material depending upon the application, and the switch may be a tact switch which carries out a switch operation in response to a force applied by the button when pushed by a user's finger. Other types of switches may be used if desired. The present invention is also a keypad incorporating the function key switch, as well as an electronic device incorporating either the function key switch alone or the keypad. The electronic device may be a mobile communications terminal or any other type of device which includes or otherwise operates using at least one function key. For illustrative purposes, the following embodiments are discussed in the context of a mobile terminal.

Figure 1:
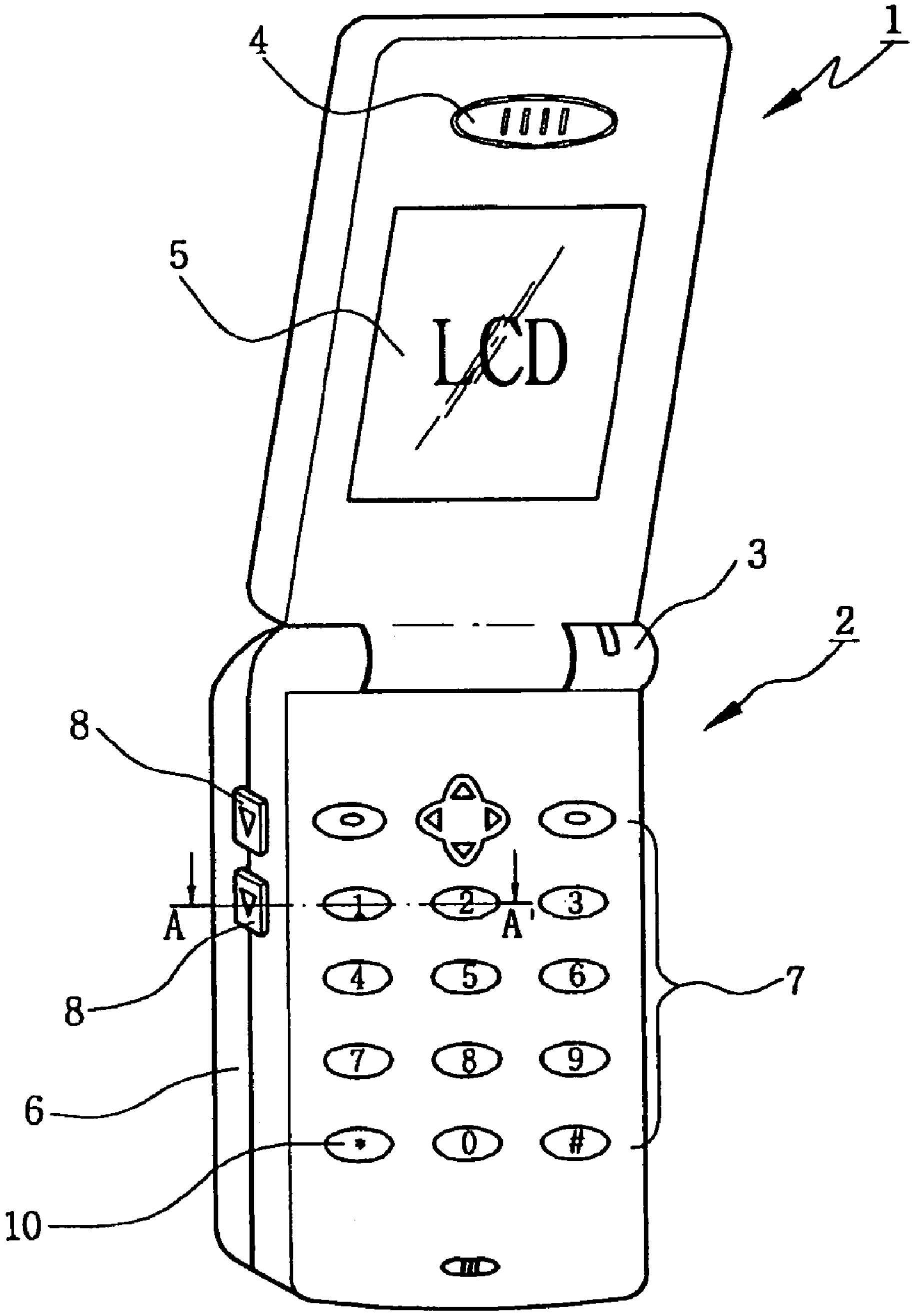
RELATED ART FIG. 1
FIG. 1 is a diagram showing one type of mobile communication terminal according to the related art.
Figure 2:
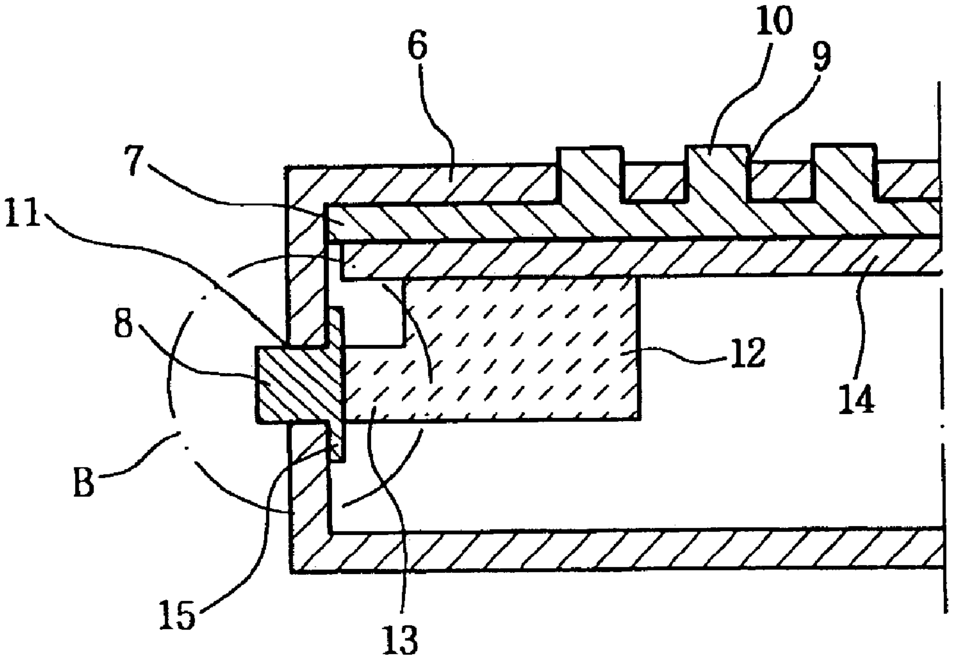
RELATED ART FIG.2
FIG. 2 is a diagram showing a cross-sectional view of the terminal of FIG. 1. cut along a section line A-A'.
Figure 3:
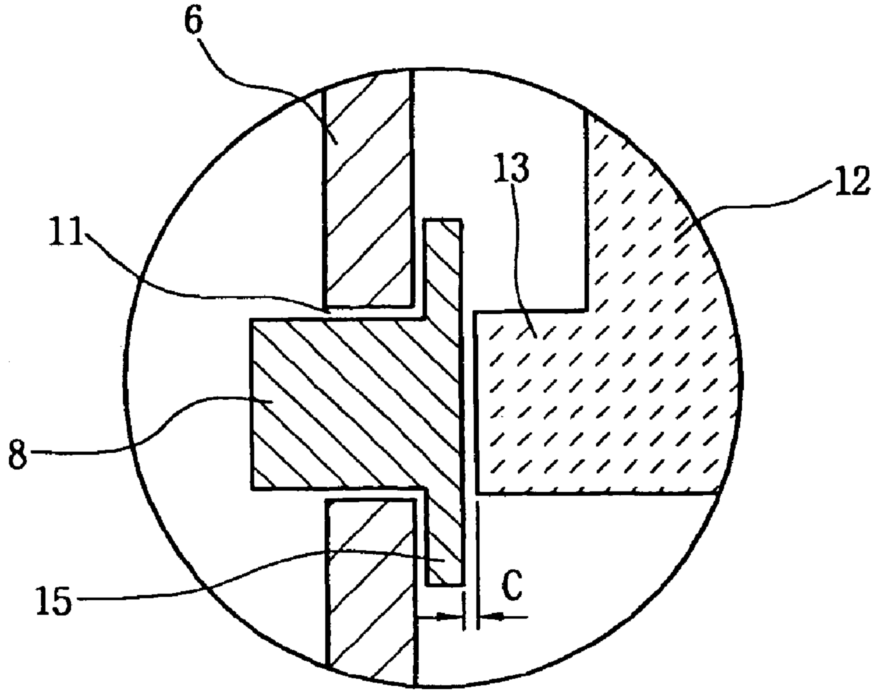
RELATED ART FIG.3
FIG. 3 is a diagram showing an enlarged cross-sectional view of a portion B in FIG. 2.
Figure 4:
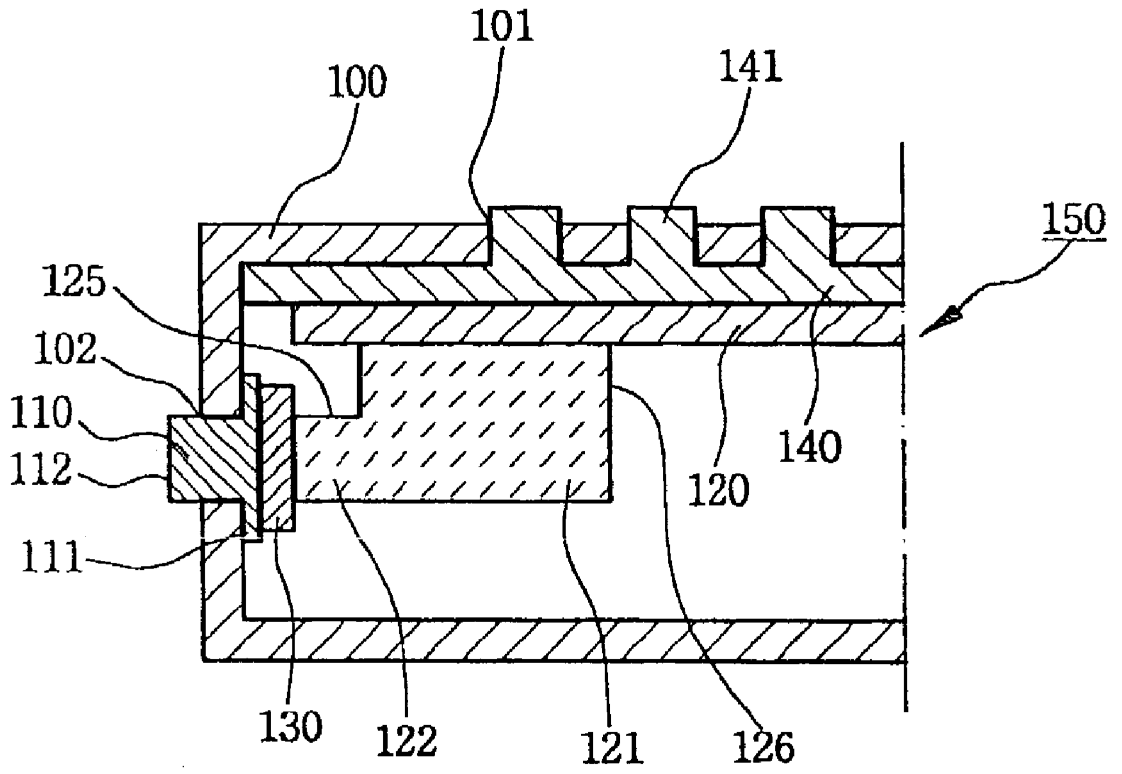
FIG. 4 is a diagram showing a partial cross-sectional view of a mobile communication terminal according to one embodiment of the present invention.

FIG. 4, shows a first embodiment of the present invention. In this embodiment, a portion of a mobile terminal is shown as including a spacer in the form of an elastic member 130 inserted between a button 110 and one end 125 of a tact switch 121. In this embodiment, the button is installed on one side of a case 100 of the terminal and thus is referred to as a side button hereinafter. Another end 126 of the tact switch is attached to a printed-circuit board 120 mounted inside the case. During installation, the side button is inserted in a side button hole 102, so that a top 112 and a bottom 111 of the side button protrude outwardly and inwardly from the case respectively. End 126 of the tact switch is attached to the printed-circuit board 120 so that a nose 122 of the switch confronts bottom 111 of the side button with a predetermined interval.

The elastic member 130 is inserted between the bottom of the side button and the nose of the tact switch. Nose 122 of the tact switch may therefore be used to support the bottom of the side button with the elastic member 130 positioned therebetween. The elastic member 130 may be formed from a variety of materials including soft rubber or silicon in order to provide cushion.

Figure 5:
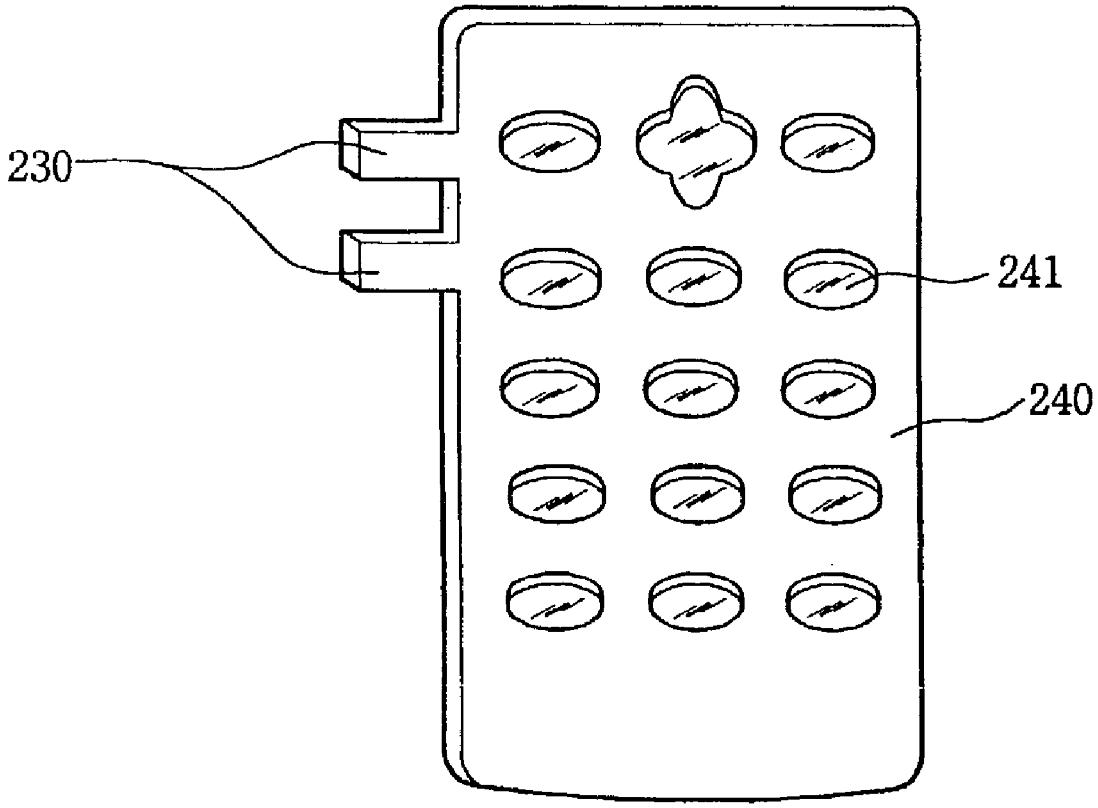
FIG. 5 is a diagram showing a view of a keypad of a mobile terminal according to a second embodiment of the present invention.

FIG. 5 shows a second embodiment of the present invention. In this embodiment, a spacers 230 are formed to protrude from one side of a keypad 240 installed inside a case 200. Tops of key buttons 241 protrude through key button holes 201 formed at a front part of the case. The spacers, which are preferably elastic members, may be made of the same material as the keypad, and if so the spacers and keypad may have a unitary construction. Alternatively, the elastic members may be connected or affixed to the side of the keypad using any conventional means of attachment, and/or the elastic members may be made from a material different from the keypad. Also, while two spacers are shown, the present invention may include only one spacer or three or more spacers in alternative embodiments. In order to extend between the side button 210 and nose 222 of the tact switch, the spacers fold down in this embodiment. Depending upon the orientation of the function keys 241 on the keypad relative to the button 210 (FIG. 6), the spacers may remain even with the keypad. The keypad 240 and spacers 230 may be formed, for example, by injection molding using a soft silicon material in the unitary construction case.

Figure 6:
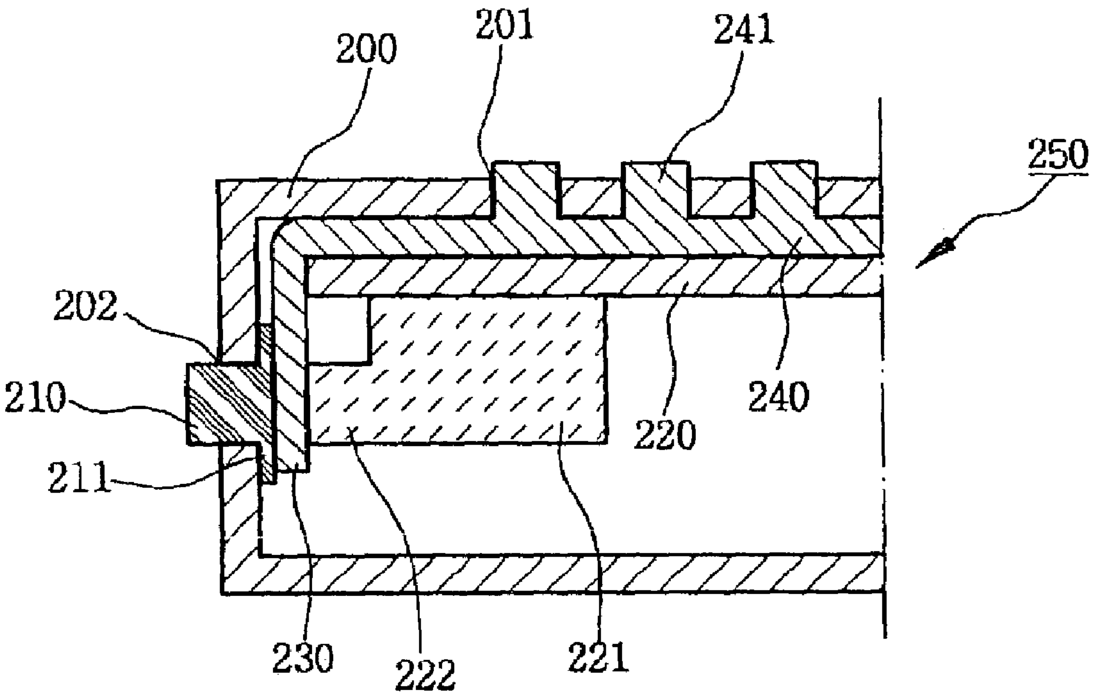
FIG. 6 is a diagram showing a cross-sectional view of the mobile communication terminal of FIG. 5.
Figure 7:
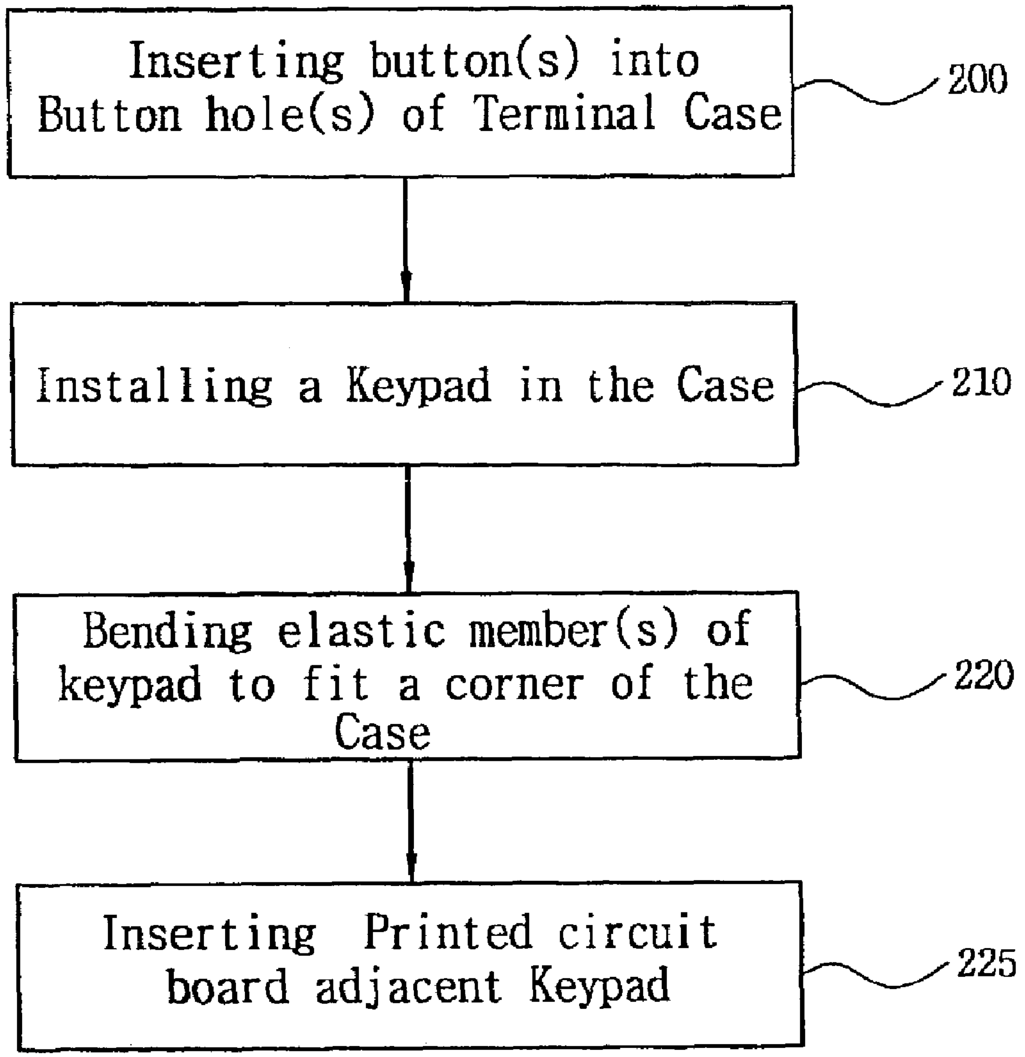
FIG. 7 is a diagram showing steps included in one embodiment of a method of scrambling a mobile communication terminal in accordance with the present invention.

FIG. 6 shows a cross-sectional view of a mobile terminal according to a second embodiment of the present invention, and FIG. 7 shows steps included in a method for assembling the terminal of the second embodiment. Here, the spacer(s) are formed as one body with the key pad 240. In assembling this terminal, first, side button 210 is inserted into side button hole 202 formed in one side of the case 200. (Block 200). In this position, the top of the side button protrudes from one side of the case, and the bottom of the button protrudes inside the case. Next, keypad 240 is installed inside the case so that tops of the key buttons 241 protrude through the key button holes 201 formed in the front part of the case (Block 210). A spacer (e.g., an elastic member) 230 of the keypad is then bent to fit a corner of the case, so that one face of the elastic member comes into contact with the bottom 211 of the side button 210 (Block 220). In a next step, printed-circuit board 220 is installed inside the case, so as to be positioned and/or adhered closely to a rear face of the keypad 240 in such a manner that nose 222 of tact switch 221 contacts the other face of spacer 230 (Block 225).

In the above-assembled present invention, nose 222 of the tact switch preferably supports the bottom of the side button and the spacer preferably has a thickness which leaves no gap between the switch and button. The side button 210 therefore does not move freely even if the terminal 250 vibrates by an external force or a vibration motor (not shown in the drawing) installed in the terminal 250. If desired, the spacer may have a thickness which is less than the clearance gap between the switch and button. Furthermore, as in all embodiments described herein, the spacer may be made from an elastic or rigid material.

Figure 8:
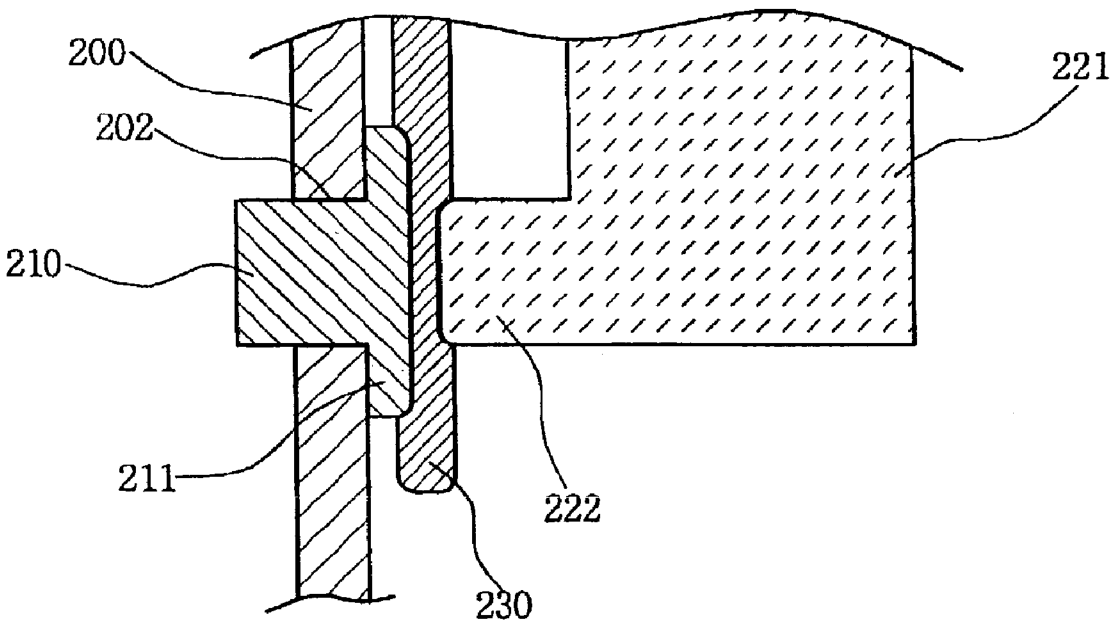
FIG. 8 is a diagram showing a cross-sectional view of how an elastic member used in accordance with one or more embodiments of the present invention may be partially distorted or compressed after assembly.

Also, in any of the foregoing embodiments the spacer of the present invention, illustratively shown by elastic member 230 in FIG. 8, may be transformed by compression to fit within the gap between the bottom of the side button and the nose of the tact switch. This may be performed even if the interval is somewhat narrower than the thickness of the elastic member, or even when no clearance gap exists between the gap and switch and it is desired to displace the button and switch to create a gap for purposes of accommodating a spacer therebetween. In this case, the pressure applied by the compressive transformation is absorbed by the spacer when made from an elastic material. In this arrangement, the nose of the tact switch may not be pushed even if the elastic spacer is transformed by compression to some extent.

Accordingly, the present invention fills the gap between a button and a tact switch with a spacer which may be an elastic member. This spacer provides an excellent cushion for button pushing and also prevents the button from moving freely and making noise when vibration is applied, such as when a vibration motor of a mobile terminal is activated. Moreover, feeling of use is improved when the button is pressed as a result of the reduction or elimination of the clearance gap and/or the cushion provided by the spacer.

The foregoing embodiments are merely exemplary and are not to be construed as limiting the present invention. The present teachings can be readily applied to other types of apparatuses. Also, the description of the present invention is intended to be merely illustrative, and not to limit the scope of the claims. Many alternatives, modifications, and variations will be apparent to those skilled in the art.

For example, while the embodiments of the invention have been described as providing a cushion for and reducing a clearance between a side button and a terminal casing, those skilled in the art can appreciate that the elastic members of the present invention may be used to cushion top surface buttons or any other button of a communications terminal, including not only hand sets but also PDAs, computers, or other types of electronic devices. Also, whole members 130 and 230 have been described as having elastic properties, these members may alternatively be made rigid materials if desired.

What is claimed is:

1. A terminal, comprising:

a case;

a keypad;

a button spaced apart from the keypad configured to be pressed by a user;

a switch in communication with the button and configured to activate a desired terminal function when the button is pressed by a user;

a spacer disposed between and contacting both the button and the switch, wherein the spacer is compressed between the switch and the button such that pressure is applied to the switch when the button is pressed by a user.

2. The terminal of claim 1, wherein the switch is a tact switch.

3. The terminal of claim 1, further comprising:

a circuit layer, wherein a first end of the switch is adjacent the spacer and a second end of the switch is adjacent the circuit layer.

4. The terminal of claim 1, wherein the spacer is made from an elastic material.

5. The terminal of claim 1, wherein the spacer is made from a rigid material.

6. The terminal of claim 1, wherein a thickness of the spacer at rest is greater than a distance between the switch and button.

7. The terminal of claim 1, wherein the spacer is connected to the keypad.

8. The terminal of claim 7, wherein the spacer and keypad are formed of a unitary construction.

9. The terminal of claim 7, wherein the spacer and keypad are made of a same material.

10. The terminal of claim 7, wherein the spacer and keypad are made of different materials.

11. The terminal of claim 7, wherein the spacer is connected at an angle relative to the keypad.

12. The terminal of claim 11, wherein the angle is at least substantially a right angle.

13. The terminal of claim 1, wherein the button includes a button portion and a base portion and a length of the spacer is substantially the same as a length of the base portion of the button.

14. A method for making a terminal, comprising:

providing a case having a keypad and at least one button spaced apart from the keypad; and placing a spacer disposed between and contacting both the button and a switch, wherein the spacer is compressed between the switch and the button such that pressure is applied to the switch when the button is pressed by a user.

15. The method of claim 14, wherein the spacer is connected to a keypad of the terminal.

16. The method of claim 15, further comprising:

bending the spacer to an angle sufficient to allow the keypad to fit within the case while the spacer is between the button and switch.

17. The method of claim 14, wherein the spacer is made from an elastic material.

18. The method of claim 14, wherein the spacer is made from a rigid material.

19. The method of claim 14, wherein the at least one button includes a button portion and a base portion and a length of the spacer is substantially the same as a length of the base portion.

20. A side button switch connected to an electronic circuit inside a mobile communications terminal, comprising:

(a) a switch button having a top at least partially projecting through a key button hole formed in a case of the terminal and a bottom which does not project through the key button hole;

(b) an elastic member adjacent the bottom of the switch button; and (c) a tact switch that performs a switch operation by a force generated from the elastic member interoperating with the switch button pushed inside the case.

21. The side button switch of claim 20, wherein the elastic member extends from a keypad.

22. The side button switch of claim 21, wherein the elastic member is made from a soft rubber or silicon material.

23. The side button switch of claim 20, wherein the switch button includes a button portion and a base portion and a length of the spacer is substantially the same as a length of the base portion.

24. A side button assembly, comprising:

at least one button spaced apart from a keypad and configured to be pressed by a user, the button at least partially extending through a side of a case;

a switch in communication with the button and configured to activate a desired terminal function when the button is pressed by the user; and a spacer disposed between and contacting both the button and the switch, wherein the spacer is compressed between the switch and the button such that pressure is applied to the switch when the button is pressed by the user.

25. The side button assembly claim 24, wherein the switch is a tact switch.

26. The side button assembly claim 24, wherein the spacer is made from an elastic material.

27. The side button assembly claim 24, wherein the spacer is made from a rigid material.

28. The side button assembly of claim 24, wherein the button includes a button portion and a base portion and a length of the spacer is substantially the same as a length of the base portion of the button.

29. A side button assembly, comprising:

at least one button spaced apart from a keypad and configured to be pressed by a user, the button at least partially extending through a side of a case;

a border portion; and a spacer connected to the border portion, wherein the spacer is compressed between a switch and the button such that pressure is applied to the switch when the button is pressed by the user.

30. The side button assembly claim 29, wherein the spacer and the border portion are made from a same material.

31. The side button assembly claim 29, wherein the spacer and the border portion have a unitary construction.

32. The side button assembly claim 29, wherein the spacer is disposed at an angle relative to the border portion.

33. The side button assembly claim 32, wherein said angle is substantially a right angle.

34. The side button assembly of claim 29, wherein the button includes a button portion and a base portion and a length of the spacer is substantially the same as a length of the base portion of the button.

* * * * *